(12) United States Patent
Lu et al.

(10) Patent No.: US 10,743,258 B2
(45) Date of Patent: Aug. 11, 2020

(54) METHOD OF BLUETOOTH COMMUNICATION GIVING CONSIDERATION TO BOTH COMMUNICATION SPEED AND POWER CONSUMPTION AND A TERMINAL THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 72 days.

(21) Appl. No.: 16/197,305

(22) Filed: Nov. 20, 2018

(65) Prior Publication Data

US 2019/0090195 A1    Mar. 21, 2019

Related U.S. Application Data

(63) Continuation of application No. PCT/CN2017/105038, filed on Sep. 30, 2017.

(30) Foreign Application Priority Data

Nov. 1, 2016  (CN) .......................... 2016 1 0943369

(51) Int. Cl.
*H04W 52/02* (2009.01)
*H04W 76/14* (2018.01)
(Continued)

(52) U.S. Cl.
CPC ......... *H04W 52/0241* (2013.01); *H04W 4/80* (2018.02); *H04W 8/005* (2013.01);
(Continued)

(58) Field of Classification Search
CPC .......... H04W 52/0241; H04W 52/028; H04W 76/32; H04W 76/11; H04W 8/005;
(Continued)

(56) References Cited

U.S. PATENT DOCUMENTS

| 6,366,557 | B1* | 4/2002 | Hunter | H04L 12/40182 370/217 |
| 2014/0273858 | A1* | 9/2014 | Panther | A61B 5/0002 455/41.2 |
| 2019/0038854 | A1* | 2/2019 | Fuchs | G06F 19/3456 |

FOREIGN PATENT DOCUMENTS

| CN | 105101055 A | 11/2015 |
| CN | 105472038 A | 4/2016 |

(Continued)

OTHER PUBLICATIONS

The International Search Report of corresponding International PCT Application No. PCT/CN2017/105038, dated Dec. 1.

*Primary Examiner* — Hashim S Bhatti
(74) *Attorney, Agent, or Firm* — J.C. Patents

(57) ABSTRACT

A method of Bluetooth communication and a terminal thereof, which relates to communication technology field. A terminal includes a MCU and a first Bluetooth module and a second Bluetooth module which are connected to the MCU; the method includes that the first Bluetooth module and the second Bluetooth module of the terminal are powered up, the second Bluetooth module activates Bluetooth broadcast, sends a broadcast package containing a Bluetooth name to a host, the first Bluetooth module and the second Bluetooth module have a same Bluetooth name and the Bluetooth name contains MAC address information of the first Bluetooth module; when the second Bluetooth module receives a Bluetooth connecting event from the host, the second Bluetooth module actively disconnects from the host and enters low power consumption state; when the first (Continued)

Bluetooth module builds connection to the host, the terminal communicates with the host.

20 Claims, 3 Drawing Sheets

(51) Int. Cl.
  *H04W 4/80* (2018.01)
  *H04W 8/00* (2009.01)
  *H04W 76/11* (2018.01)
  *H04W 76/32* (2018.01)
(52) U.S. Cl.
  CPC ..... *H04W 52/028* (2013.01); *H04W 52/0238* (2013.01); *H04W 76/11* (2018.02); *H04W 76/14* (2018.02); *H04W 76/32* (2018.02); *H04W 52/0229* (2013.01); *Y02D 70/10* (2018.01); *Y02D 70/14* (2018.01)
(58) Field of Classification Search
  CPC ... H04W 4/80; H04W 76/14; H04W 52/0238; H04W 52/0229; Y02D 70/10; Y02D 70/14
  See application file for complete search history.

(56) References Cited

FOREIGN PATENT DOCUMENTS

| | | |
|---|---|---|
| CN | 106060904 A | 10/2016 |
| CN | 106658677 A | 5/2017 |

\* cited by examiner

METHOD OF BLUETOOTH COMMUNICATION GIVING CONSIDERATION TO BOTH COMMUNICATION SPEED AND POWER CONSUMPTION AND A TERMINAL THEREOF

CROSS-REFERENCE TO RELATED APPLICATIONS

This application is a continuation of International Patent Application No. PCT/CN2017/105038, filed on Sep. 30, 2017, which claims priority to Chinese Patent Application No. 201610943369.5 filed on Nov. 1, 2016, the entire contents of which are incorporated into the present application by reference.

TECHNICAL FIELD

The present disclosure relates to a communication technology field, more particularly to a method of Bluetooth communication giving consideration to both communication speed and power consumption and a terminal thereof.

BACKGROUND

With the development of mobile e-commerce, the payment via a mobile phone becomes main trend for payment made by people currently. More and more payment terminals, such as a POS machine, communicate with the mobile phone via Bluetooth. Generally, a payment terminal is required to support Felica, i.e. contactless smart card, transaction, while Felica transaction has a strict requirement for communication speed of the payment terminal, accompanied with a problem of speed of Bluetooth communication between the POS machine and the mobile phone. Therefore, in order to ensure data transferring speed, a Bluetooth module complied with BT classic standard, such as a Bluetooth 3.0 chip, is adapted in the payment terminal in the prior art to achieve a goal of completing transaction communication in a regulated time period.

Though using the Bluetooth 3.0 chip in the payment terminal ensures communication speed, disadvantage of using Bluetooth 3.0 chip such as high standby power consumption in stand by state exists. Since most of POS machines use scheme regarding built-in battery at present, high standby power consumption would lead the operational lifespan of the POS machine to be shortened and frequent charging also affects users' experience.

SUMMARY

In order to solve problems existing in the prior art, the present disclosure provides a method of Bluetooth communication giving consideration to both communication speed and power consumption and a terminal.

A technical means of the present disclosure includes a terminal giving consideration to both communication speed and power consumption, including a Microcontroller Unit (MCU) and a first Bluetooth module and a second Bluetooth module which are connected to the MCU;

the MCU is configured to power up the first Bluetooth module and the second Bluetooth module; wherein the first Bluetooth module and the second Bluetooth module have a same Bluetooth name which containing Media Access Control (MAC) address information of the first Bluetooth module;

the second Bluetooth module is configured to activate Bluetooth broadcast, send a broadcast package containing the Bluetooth name to the host and wait for a Bluetooth communicating event; and further configured to initialize a disconnecting event to the host, disconnect from the host, and enter low power consumption state, when the Bluetooth communicating event sent by the host is received;

the first Bluetooth module is configured to realize communication between the terminal and the host when connection to the host is built.

The above mentioned terminal further includes a storage module connected to the MCU, wherein the storage module is configured to store the Bluetooth name; the MCU specifically is configured to determine whether performing operation of setting Bluetooth name is required according to the Bluetooth name stored in the storage module; if yes, reading the MAC address of the first Bluetooth module, forming the Bluetooth name according to the MAC address of the first Bluetooth module and a SN code of the terminal, and setting name corresponding to the first Bluetooth module and the second Bluetooth module to be the Bluetooth name; if no, triggering the second Bluetooth module.

The above mentioned second Bluetooth module is further configured to switch the Bluetooth broadcast from normal broadcast state to slow broadcast state when low power consumption state is entered; and configured to switch the Bluetooth broadcast from slow broadcast state to normal broadcast state when being waken up.

The above mentioned second Bluetooth module is further configured to enter the low power consumption state when time for waiting the Bluetooth connecting event is out; the MCU includes a timer module, wherein the timer module is specifically configured to trigger the MCU to power down the first Bluetooth module when detecting that time for the second Bluetooth module waiting the Bluetooth connecting is out; the MCU is further configured to power up the first Bluetooth module when detecting that the second Bluetooth module is waken up.

A technical means of the present disclosure further includes a method of Bluetooth communication giving consideration to both communication speed and power consumption, including: powering up a first Bluetooth module and a second Bluetooth module of a terminal; activating, by the second Bluetooth module, a Bluetooth broadcast, sending a broadcast package containing a Bluetooth name to a host, wherein the first Bluetooth module and the second Bluetooth module have same Bluetooth name containing MAC address information of the first Bluetooth module;

initializing, by the second Bluetooth module, a disconnecting event to the host, disconnecting, by the second Bluetooth module of the terminal, from the host, and entering, by the second Bluetooth module, low power consumption state, when the second Bluetooth module of the terminal receives an Bluetooth connecting event sent from the host;

realizing, by the first Bluetooth module, communication between the terminal and the host when building connection to the host.

Before activating, by the second Bluetooth module, a Bluetooth broadcast, the method further includes: determining, by the terminal, whether performing operation of setting the Bluetooth name is required; if yes, setting, by the terminal, a same Bluetooth name for the first Bluetooth module and the second Bluetooth module; if no, directly activating, by the second Bluetooth module, the Bluetooth broadcast.

The setting, by the terminal, a same Bluetooth name for the first Bluetooth module and the second Bluetooth module specifically includes: reading, by a MCU of the terminal, the MAC address of the first Bluetooth module, forming a Bluetooth name according to the MAC address of the first Bluetooth module and a SN code of the terminal, and setting name corresponding to the first Bluetooth module and the second Bluetooth module to be the Bluetooth name.

The forming a Bluetooth name according to the MAC address of the first Bluetooth module and a SN code of the terminal specifically includes: splicing the SN code of the terminal and the last sixth bits of the MAC address of the first Bluetooth module to obtain the Bluetooth name.

In the above mentioned method, when the first Bluetooth module builds a connection to the host, the second Bluetooth module is in low power consumption state.

When the second Bluetooth module is in low power consumption state, the method further includes switching the Bluetooth broadcast from normal broadcast state to slow broadcast state; when the second Bluetooth module is waken up, the method further includes switching the Bluetooth broadcast from slow broadcast state to the normal broadcast state.

The above mentioned method further includes when time for the second Bluetooth module waiting Bluetooth connecting event is out, powering down the first Bluetooth module and entering, by the second Bluetooth module, low power consumption state; when the second Bluetooth module is waken up, the first Bluetooth module powers up and waits for building connection to the host.

The technical means of the present disclosure further includes a terminal giving consideration to both communication speed and power consumption, including a MCU chip and a first Bluetooth chip and a second Bluetooth chip which are connected to the MCU chip;

the MCU chip is configured to power up the first Bluetooth chip and the second Bluetooth chip; wherein the first Bluetooth chip and the second Bluetooth chip have a same Bluetooth name which contains MAC address information of the first Bluetooth chip;

the second Bluetooth chip is configured to activate a Bluetooth broadcast, send a broadcast package containing the Bluetooth name to the host and wait for a Bluetooth communicating event; and is further configured to initialize a disconnecting event to the host, disconnect from the host, and enter low power consumption state, when the Bluetooth communicating event sent by the host is received;

the first Bluetooth chip is configured to realize communication between the terminal and the host when connection to the host is built.

The advantage of the present disclosure is as the following: through lower cost, a Bluetooth payment terminal with Felica transaction function decreases standby power consumption, decreases charging frequency, and increases users' experience.

DESCRIPTION OF EMBODIMENTS

The technical means of the embodiments of the disclosure are described clearly and completely in conjunction with the accompanying drawings as follows. Apparently, the described embodiments are merely a part of but not all of the embodiments of the present disclosure. Based on the described embodiments of the present disclosure, all of other embodiments obtained by those skilled in the art without any creative work belong to the scope of the present disclosure.

Embodiment 1

The terminal of the present embodiment includes a Microcontroller Unit chip, which is abbreviated as MCU hereafter, two Bluetooth chips, which are abbreviated as a first Bluetooth module and a second Bluetooth module; preferably, the first Bluetooth module adapts a Bluetooth chip in BT Classic standard; the second Bluetooth module adapts a Bluetooth chip in BLE standard.

Figure 1:
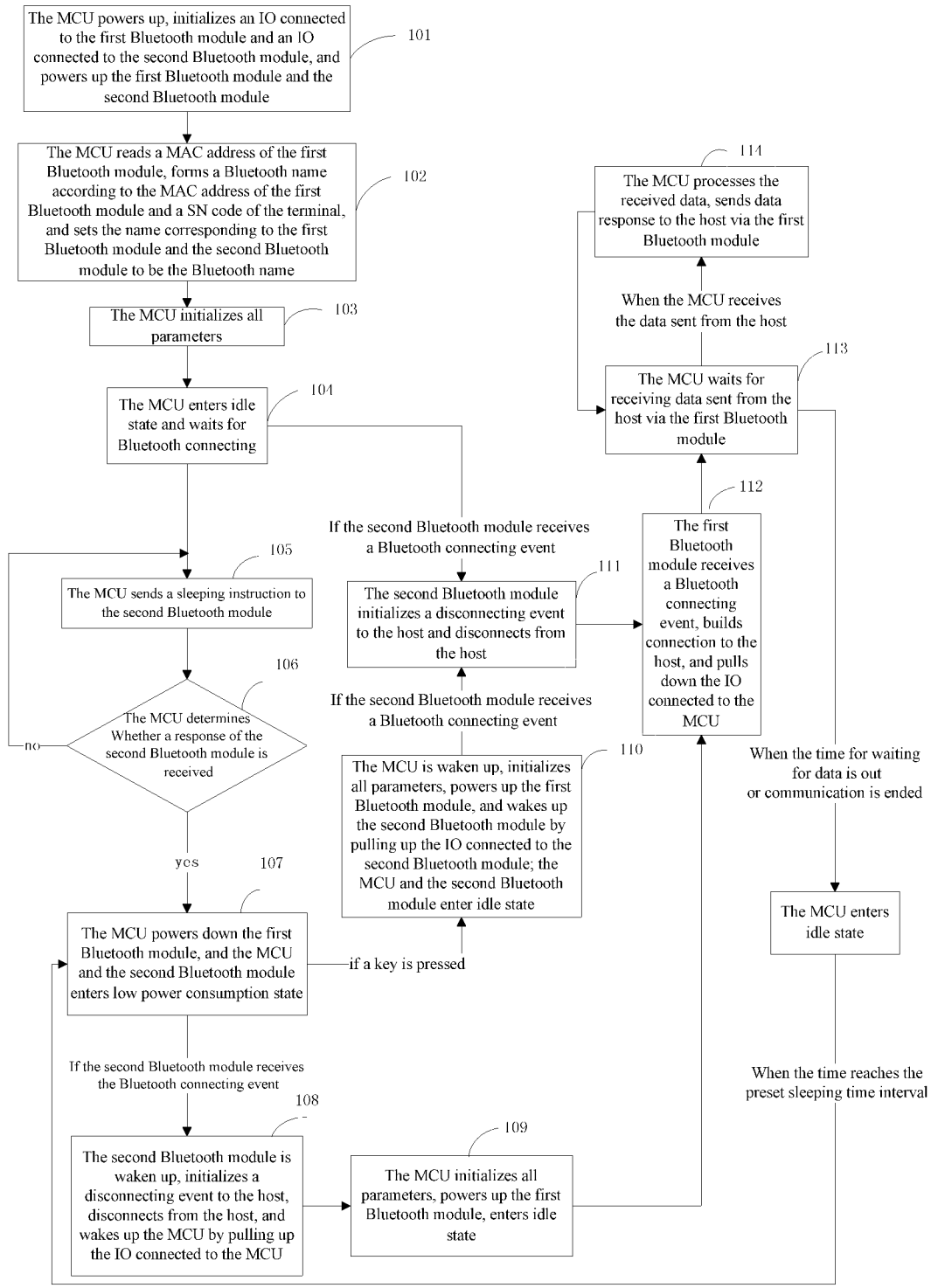
FIG. 1 is a flow chart of a method of Bluetooth communication giving consideration to both communication speed and power consumption provided by embodiment 1 of the present disclosure.

The present embodiment implements a method of Bluetooth communication giving consideration to both communication speed and power consumption based on the above mentioned terminal. As shown in FIG. 1, the method includes following steps.

Step 101, the MCU powers up, initializes an IO connected to the first Bluetooth module and an IO connected to the second Bluetooth module, and powers up the first Bluetooth module and the second Bluetooth module.

Further, the present step includes initializing a timer, a real time clock.

Step 102, the MCU reads a MAC address of the first Bluetooth module, forms a Bluetooth name according to the MAC address of the first Bluetooth module and a SN code of the terminal, and sets the name corresponding to the first Bluetooth module and the second Bluetooth module to be the Bluetooth name.

Specifically, the MCU reads the MAC address of the first Bluetooth module by sending a reading instruction to the first Bluetooth module; the MCU forms the Bluetooth name according to the read MAC address of the first Bluetooth module and the read SN code of the terminal, sends a setting instruction to the first Bluetooth module and the second Bluetooth module respectively, and sets the name corresponding to the first Bluetooth module and the second Bluetooth module to be the Bluetooth name.

Forming a Bluetooth name according to the MAC address of the first Bluetooth module and a SN code of the terminal specifically includes splicing the SN code of the terminal and the last sixth bits of the MAC address of the first Bluetooth module to obtain the Bluetooth name.

For example, the MAC address of the first Bluetooth module is 3481F40A05CF, the SN code of the terminal is 1234567890, and the Bluetooth name is set to be 12345678900A05CF.

Preferably, before the step 102, the method also includes: the MCU determines whether performing operation of setting the Bluetooth name is required; if yes, step 102 is performed; if no, the MCU enters idle state, the second Bluetooth enters low power consumption, and step 112 is performed.

In the present embodiment, the MCU determines whether performing operation of setting the Bluetooth name is required by determining whether a preset flag is set to determine whether the Bluetooth name is required to be set. If the preset flag is set, setting the Bluetooth name for the first Bluetooth module and the second Bluetooth module is not required. If the preset flag is not set, setting the Bluetooth name for the first Bluetooth module and the second Bluetooth module is required and the preset flag is set. In the present embodiment, if the terminal has built connection to the host once, the preset flag is set, performing operation of setting the Bluetooth name can be omitted, the MCU enters idle state after the step 101, the second Bluetooth module enters low power consumption state, and the step 112 is performed.

Further, the terminal has set the first Bluetooth module and the second Bluetooth module with the same Bluetooth name before ex-factory. Correspondingly, in a process of the present embodiment, the step 102 can be omitted and step 103 can be performed directly after the step 101. Preferably, the Bluetooth name can be obtained by splicing the SN code of the terminal and the last bits of the MAC address of the first Bluetooth module.

Step 103, the MCU initializes all parameters.

Specifically, the parameters initialized by the MCU includes a sleeping time interval, an automatic shut down time interval, a version number, a system language, etc.

Step 104, the MCU enters idle state and waits for Bluetooth connecting; if the time for waiting Bluetooth connecting event is out, step 105 is performed; if the second Bluetooth module receives a Bluetooth connecting event, step 111 is performed.

Specifically, after the MCU enters idle state, i.e. ready state, the method further includes activating the timer; if the time counted by the timer reaches the preset sleeping time interval and the second Bluetooth module has not received the Bluetooth connecting event, the time for waiting Bluetooth connecting event is determined to be out and the step 105 is performed.

Step 105, the MCU sends a sleeping instruction to the second Bluetooth module.

Specifically, the sleeping instruction is 0xaa 0x55 0x01 0x00 0x00 0xFE.

Step 106, the MCU determines whether a response of the second Bluetooth module is received; if yes, step 107 is performed; if not, the step 105 is performed.

Specifically, the MCU determines whether 0x55 0xaa 0x01 0x00 0xFE is received; if yes, the step 107 is performed; if not, the step 105 is performed.

Step 107, the MCU powers down the first Bluetooth module, and the MCU and the second Bluetooth module enters low power consumption state; if the second Bluetooth module receives the Bluetooth connecting event, step 108 is performed; if a key is pressed, step 110 is performed.

Specifically, when the MCU and an IO connected to a key module are pulled up, it represents that a key is pressed down.

Further, after the MCU and the second Bluetooth module enter low power consumption state, the method further includes: if the time counted by the timer reaches the preset shut down time interval and no Bluetooth connecting event or key triggering is received, the terminal shuts down automatically.

Alternatively, when the MCU detects that time length of pressing a key reaches time length for shutting down, the terminal shuts down automatically. Specifically, the MCU detects that the time of pulling up the IO connected to the key module reaches the preset shut down time interval, the terminal shuts down automatically.

In the present embodiment, when the second Bluetooth module enters low power consumption state, the method further includes: the Bluetooth broadcast is switched from normal broadcast state to slow broadcast state; correspondingly, when the second Bluetooth module is waken up, the method further includes: the Bluetooth broadcast is switched from slow broadcast state to normal broadcast state.

Step 108, the second Bluetooth module is waken up, initializes a disconnecting event to the host, disconnects from the host, and wakes up the MCU by pulling up the IO connected to the MCU.

Step 109, the MCU initializes all parameters, powers up the first Bluetooth module, and enters idle state; then the step 112 is performed.

Step 110, the MCU is waken up, initializes all parameters, powers up the first Bluetooth module, and wakes up the second Bluetooth module by pulling up the IO connected to the second Bluetooth module; the MCU and the second Bluetooth module enter idle state;

if the second Bluetooth module receives a Bluetooth connecting event, the step 111 is performed.

Step 111, the second Bluetooth module initializes a disconnecting event to the host and disconnects from the host.

Step 112, the first Bluetooth module receives a Bluetooth connecting event, builds connection to the host, and pulls down the IO connected to the MCU.

Specifically, the first Bluetooth module informs the MCU that the first Bluetooth module builds the connection to the host currently by pulling down the IO connected to the MCU.

Step 113, the MCU waits for receiving data sent from the host via the first Bluetooth module, step 114 is performed when the MCU receives the data sent from the host, the MCU enters idle state when the time for waiting data is out or communication is ended, and the step 107 is performed when the time reaches the preset sleeping time interval.

Specifically, after the MCU enters the idle state, the method further includes: setting the timer to begin the sleeping counting; if the counting time reaches the preset sleeping time interval, returning to perform the step 107.

Step 114, the MCU processes the received data, sends data response to the host via the first Bluetooth module, then returning to the step 113.

Specifically, the present step includes: the MCU determines data type according to the received data, performs corresponding operation according to the data type, obtains data response according to operation result, and sends the data response to the host via the first Bluetooth module.

For example, when the received data is 02 02 03, the data type is card type obtaining instruction, the terminal performs card searching operation, if a card exists, the MCU returns 90 00 02 to the host via the first Bluetooth module, if a card does not exist, the MCU returns 90 00 00 to the host via the first Bluetooth module.

When the received data is 02 04 00 05 03, the data type is card activating instruction, the terminal performs card activating operation, if the card is activated successfully, the MCU returns 90 00 02 00 08 06 78 80 78 02 80 56 BC to the host via the first Bluetooth module, if time for activating the card is out, the MCU returns 00 59 to the terminal via the first Bluetooth module.

When the received data is 02 05 02 00 0C 00 A4 04 00 07 A0 00 00 03 33 01 01, the data type is file selecting instruction, the terminal informs the card to perform file selecting operation, if the selecting is successful, the MCU returns 6F3E8407A0000003330101A533500B50424-
F43204352454449548701019F38189F66049F0
2069F03069F1A0295055F2A029A039C019F3704BF-
0C059F4D020B0A9000 to the host via the first Bluetooth
module, if the selecting is failed, the MCU returns 6E 00 to
the host via the first Bluetooth module.

When the received data is 02 05 02 00 05 80 CA 9F 79
09, the data type is the reading instruction. The terminal
reads card data and the MCU returns
9F79060000000110009000 to the host via the first Bluetooth module.

When the received data is 02 06, the terminal powers
down the card, and the MCU returns 90 00 to the host via
the first Bluetooth module.

In the present embodiment, two independent Bluetooth
modules, i.e. the first Bluetooth module and the second
Bluetooth module, which are connected to the MCU, are
designed in the terminal. In this case, the first Bluetooth
module is preferably Bluetooth 3.0 chip, the second Bluetooth module is preferably Bluetooth 4.0 chip, the first
Bluetooth module is configured to implement communication between the terminal in normal working time and the
host so as to complete Felica transaction. The second
Bluetooth module is configured to wait for connecting to the
host when the terminal is in sleeping time, wake up the
terminal in the sleeping time after connecting to the host,
and disconnect from the host actively. The terminal powers
up the first Bluetooth module after being waken up and waits
for interacting with the host via the first Bluetooth module.

Embodiment 2

Figure 2:
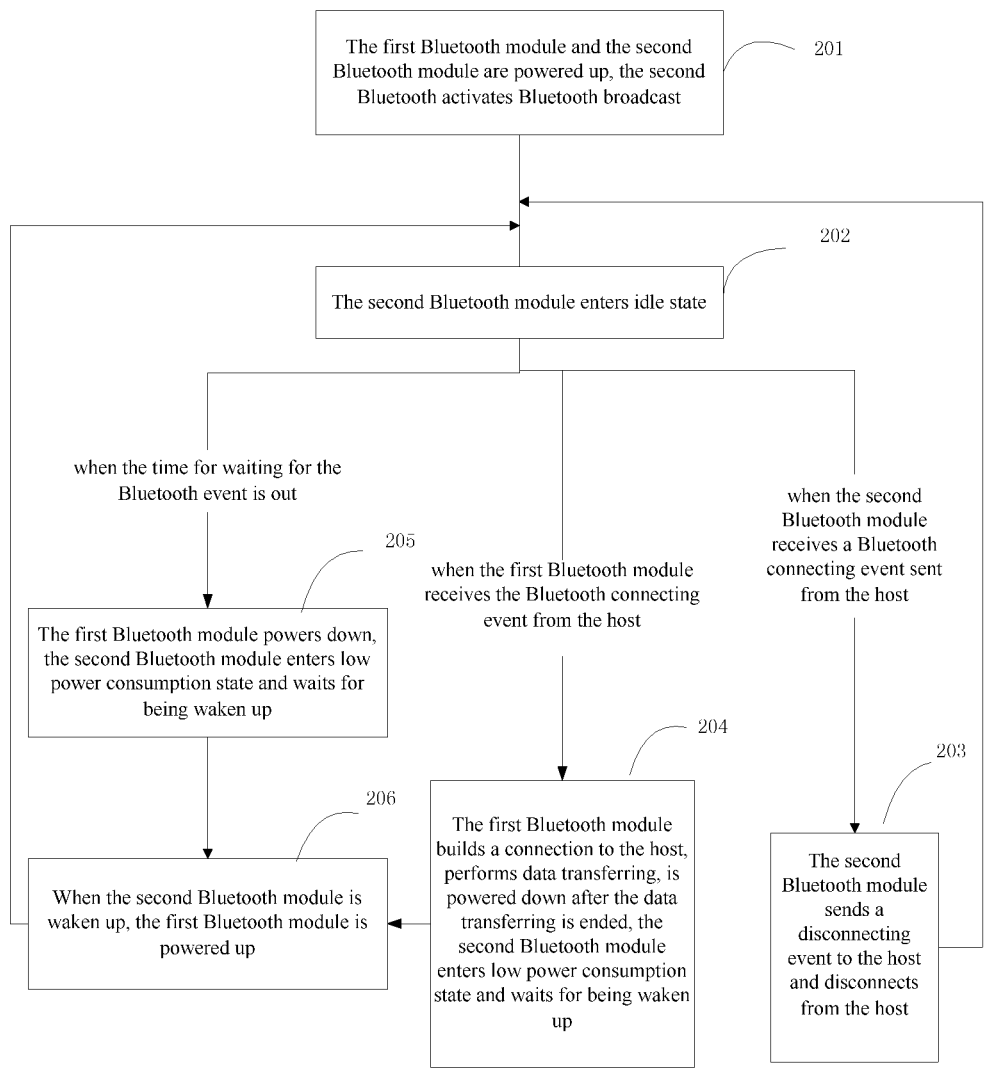
FIG. 2 is a flow chart of a method of Bluetooth communication giving consideration to both communication speed and low power consumption provided by embodiment 2 of the present disclosure.

The present embodiment 2 implements a method of
Bluetooth communication giving consideration to both communication speed and power consumption by designing two
independent Bluetooth chips, i.e. a first Bluetooth module
and a second Bluetooth module, inside the terminal. As
shown in FIG. 2, the method of cooperation of two Bluetooth chips includes following steps.

Step 201, the first Bluetooth module and the second
Bluetooth module are powered up, the second Bluetooth
activates Bluetooth broadcast.

Specifically, the second Bluetooth module activates the
Bluetooth broadcast and sends a broadcast package containing a Bluetooth name to a host, wherein the Bluetooth name
contains MAC address information of the first Bluetooth
module. The host analyzes the broadcast package after
receiving the broadcast package and builds a connection to
the first Bluetooth module according to the MAC address
obtained by analyzing the broadcast package.

Step 202, the second Bluetooth module enters idle state.

When the second Bluetooth module receives a Bluetooth
connecting event sent from the host, step 203 is performed;
when the first Bluetooth module receives the Bluetooth
connecting event from the host, step 204 is performed; when
the time for waiting the Bluetooth event is out, step 205 is
performed.

Step 203, the second Bluetooth module sends a disconnecting event to the host and disconnects from the host, and
the step 202 is returned.

Step 204, the first Bluetooth module builds a connection
to the host, performs data transferring, is powered down
after the data transferring is ended, the second Bluetooth
module enters low power consumption state and waits for
being waken up, step 206 is performed.

Step 205, the first Bluetooth module powers down, the
second Bluetooth module enters low power consumption
state and waits for being waken up.

Specifically, when the second Bluetooth module enters
low power consumption state, the method further includes
the Bluetooth broadcast switches from normal broadcast
state to slow broadcast state.

Further, after the second Bluetooth module enters low
power consumption state, the method further includes that
the terminal shuts down automatically if the second Bluetooth module has not been waken up in a preset shut down
time interval.

Step 206, when the second Bluetooth module is waken up,
the first Bluetooth module is powered up, and the step 202
is returned.

Specifically, when the second Bluetooth module is waken
up, the method further includes that the second Bluetooth
module switches the Bluetooth broadcast from the slow
broadcast state to the normal broadcast state.

The feature of the means provided by the present embodiment lies in that two independent Bluetooth modules, i.e. the
first Bluetooth module and the second Bluetooth module, are
designed in the terminal. The first Bluetooth module, which
is in BT Classic standard, is configured to implement
communication between the terminal in normal working
time and the host so as to complete Felica transaction. The
second Bluetooth module, which is in BLE standard, is
configured to wait for connecting to the host when the
terminal is in sleeping time, wake up the terminal in the
sleeping state after connecting to the host, and disconnect
from BLE actively. The terminal powers up the first Bluetooth module after being waken up and waits for interacting
with the host via the first Bluetooth module.

Embodiment 3

Figure 3:
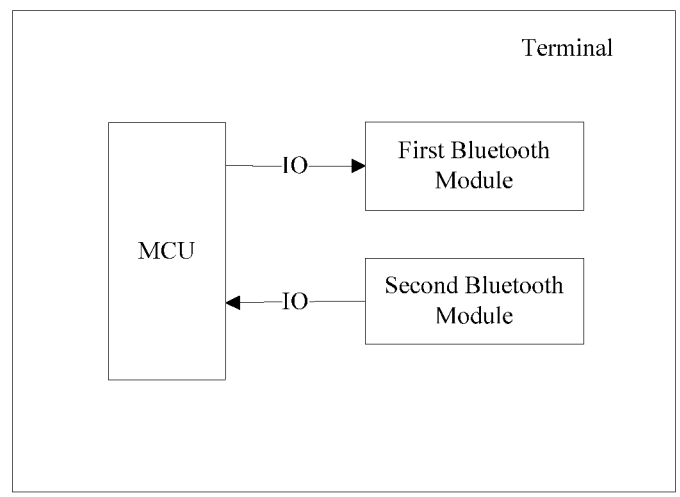
FIG. 3 is a structural diagram of a terminal giving consideration to both communication speed and power consumption provided by embodiment 3 of the present disclosure.

The present embodiment provides a terminal giving consideration to both communication speed and power consumption. As shown in FIG. 3, the terminal includes a MCU
and a first Bluetooth module and a second Bluetooth module
which are connected to the MCU; Preferably, the first
Bluetooth module adapts a Bluetooth chip in BT Classic
standard, for example, Bluetooth chip 3.0; the second Bluetooth module adapts a Bluetooth chip in BLE standard, for
example, Bluetooth chip 4.0.

The MCU is configured to power up the first Bluetooth
module and the second Bluetooth module; specifically, the
MCU powers up the first Bluetooth module and the second
Bluetooth module via initializing an IO connected to the first
Bluetooth module and an IO connected to the second
Bluetooth module.

The first Bluetooth module and the second Bluetooth
module in the present embodiment have same Bluetooth
name which contains MAC address information of the first
Bluetooth module.

The second Bluetooth module is configured to activate the
Bluetooth broadcast, send the broadcast package containing
the Bluetooth name to the host and wait for a Bluetooth
connecting event; the second Bluetooth module further is
configured to, when the Bluetooth connecting event sent
from the host is received, initialize a disconnecting event to
the host, disconnect from the host and enter low power
consumption state.

The first Bluetooth module is configured to implement
communication between the terminal and the host when a
connection to the host is built. The first Bluetooth module is further configured to pull down an IO connected to the MCU when the connection to the host is built.

Preferably, the MCU is further configured to determine whether performing operation of setting the Bluetooth name is required; if yes, setting a same name for the first Bluetooth module and the second Bluetooth module; if no, triggering the second Bluetooth module. The terminal further includes a storage module connected to the MCU; the storage module is configured to store the Bluetooth name; the MCU specifically is configured to determine whether performing operation of setting Bluetooth name is required according to the Bluetooth name stored in the storage module, if yes, reading the MAC address of the first Bluetooth module, forming the Bluetooth name according to the MAC address of the first Bluetooth module and a SN code of the terminal, and setting name corresponding to the first Bluetooth module and the second Bluetooth module to be the Bluetooth name; if no, triggering the second Bluetooth module.

The second Bluetooth module provided by the present embodiment is further configured to switch Bluetooth broadcast from normal broadcast state to slow broadcast state when low power consumption state is entered; and switch Bluetooth broadcast from slow broadcast state to normal broadcast sate when being waken up.

Further, the second Bluetooth module is further configured to enter low power consumption state when time for waiting Bluetooth connecting event is out; the MCU includes a timer module which is specifically configured to trigger the MCU to power down the first Bluetooth module when detecting that the time for the second Bluetooth module waiting the Bluetooth connecting is out; the MCU further is configured to power up the first Bluetooth module when detecting that the second Bluetooth module is waken up; the MCU further is configured to send a sleeping instruction to the second Bluetooth module when the timer module detects that the time for the second Bluetooth module waiting Bluetooth connecting is out; the second Bluetooth module is specifically configured to enter low power consumption state when the sleeping instruction is received.

Correspondingly, the second Bluetooth module is specifically configured to wake up the MCU by pulling up an IO connected to the MCU when being waken up by receiving the Bluetooth connecting event.

The MCU further includes a key module; the MCU specifically is configured to be waken up when the MCU detects that a key is pressed via the key module; the MCU further is configured to perform initialization and power up the first Bluetooth module when being waken up, and wake up the second Bluetooth module by pulling up the IO connected to the second Bluetooth module.

Preferably, the MCU further includes an automotive shut down module which is configured to trigger the terminal to shut down automatically when the MCU detects that the second Bluetooth module is not waken up within a preset shut down time interval.

Alternatively, the MCU further includes an automatic shut down module and the key module; the automatic shut down module is configured to trigger the terminal to shut down automatically when time length of key pressing of the key module reaches time length for shutting down.

The described embodiments are only specific embodiments of the present disclosure, but are not to be construed as limiting the scope of the disclosure. The variations or substitution easily obtained by those skilled in the art within the scope disclosed by the present disclosure should be within the scope of the present disclosure. Therefore, the scope of the present disclosure should be determined by the scope of the appended claims.

What is claimed is:

1. A method of Bluetooth communication giving consideration to both communication speed and power consumption, comprising:
   powering up a first Bluetooth module and a second Bluetooth module of a terminal; activating, by the second Bluetooth module, a Bluetooth broadcast, sending a broadcast package containing a Bluetooth name to a host, wherein the first Bluetooth module and the second Bluetooth module have same Bluetooth name containing Media Access Control (MAC) address information of the first Bluetooth module;
   initializing, by the second Bluetooth module, a disconnecting event to the host, disconnecting, by the second Bluetooth module of the terminal, from the host, and entering, by the second Bluetooth module, low power consumption state, when the second Bluetooth module of the terminal receives an Bluetooth connecting event sent from the host;
   realizing, by the first Bluetooth module, communication between the terminal and the host when building connection to the host.

2. The method according to claim 1, wherein before activating, by the second Bluetooth module, a Bluetooth broadcast, the method further comprises: determining, by the terminal, whether performing operation of setting the Bluetooth name is required; if yes, setting, by the terminal, a same Bluetooth name for the first Bluetooth module and the second Bluetooth module; if no, directly activating, by the second Bluetooth module, the Bluetooth broadcast.

3. The method according to claim 2, wherein the setting, by the terminal, a same Bluetooth name for the first Bluetooth module and the second Bluetooth module specifically comprises: reading, by a Microcontroller Unit (MCU) of the terminal, the MAC address of the first Bluetooth module, forming a Bluetooth name according to the MAC address of the first Bluetooth module and a SN code of the terminal, and setting name corresponding to the first Bluetooth module and the second Bluetooth module to be the Bluetooth name.

4. The method according to claim 1, wherein, the first Bluetooth module and the second Bluetooth module having same Bluetooth name specifically comprises that setting, by the terminal, the first Bluetooth module and the second Bluetooth module with the same Bluetooth name before ex-factory.

5. The method according to claim 1, wherein when the first Bluetooth module builds the connection to the host, the second Bluetooth module is in low power consumption state.

6. The method according to claim 1, wherein, when the second Bluetooth module is in low power consumption state, the method further comprises switching the Bluetooth broadcast from normal broadcast state to slow broadcast state;
   when the second Bluetooth module is waken up, the method further comprises switching the Bluetooth broadcast from slow broadcast state to the normal broadcast state.

7. The method according to claim 1, wherein the method further comprises when time for the second Bluetooth module waiting Bluetooth connecting event is out, powering down the first Bluetooth module and the second Bluetooth module enters low power consumption state;

when the second Bluetooth module is waken up, the first Bluetooth module powers up and waits for building connection to the host.

8. The method according to claim 7, wherein when the time for the second Bluetooth module waiting the Bluetooth connecting event is out, powering down the first Bluetooth module and the second Bluetooth module enters low power consumption state specifically comprises: sending, by a MCU of the terminal, a sleeping instruction to the second Bluetooth module, powering down, by the MCU, the first Bluetooth module, and the MCU and the second Bluetooth module enters low power consumption state.

9. The method according to claim 1, wherein the method further comprises when the MCU of the terminal detects that time length for pressing a key reaches time length for shutting down, the terminal shuts down automatically.

10. The method according to claim 1, wherein the powering up the first Bluetooth module and the second Bluetooth module of the terminal specifically comprises: a MCU of the terminal powers up, the MCU, initializes an IO connected to the first Bluetooth module and an IO connected to the second Bluetooth module, and powers up the first Bluetooth module and the second Bluetooth module.

11. The method according to claim 1, wherein when the first Bluetooth module builds the connection to the host, the method further comprises: the first Bluetooth module pull low an IO connected to a MCU of the terminal, and the terminal waits for communicating with the host.

12. The method according to claim 1, wherein the terminal communicating with the host specifically comprises: when a MCU of the terminal receives the data sent from the host via the first Bluetooth module, the terminal communicates with the host; when the time for the MCU of the terminal waiting for receiving the data sent by the host is out or the communication between the MCU of the terminal and the host is over, the MCU powers down the first Bluetooth module, the MCU and the second Bluetooth module enter low power consumption state; when the MCU of the terminal detects that the first Bluetooth module is disconnected from the host, the MCU powers down the first Bluetooth module, and the MCU and the second Bluetooth module enters low power consumption state.

13. A terminal giving consideration to both communication speed and power consumption, comprising a Microcontroller Unit (MCU) and a first Bluetooth module and a second Bluetooth module which are connected to the MCU;
the MCU is configured to power up the first Bluetooth module and the second Bluetooth module; wherein the first Bluetooth module and the second Bluetooth module have a same Bluetooth name which contains Media Access Control (MAC) address information of the first Bluetooth module;
the second Bluetooth module is configured to activate Bluetooth broadcast, send a broadcast package containing the Bluetooth name to the host and wait for a Bluetooth communicating event; and further configured to initialize a disconnecting event to the host, disconnect from the host, and enter low power consumption state, when the Bluetooth communicating event sent by the host is received;
the first Bluetooth module is configured to realize communication between the terminal and the host when building connection to the host.

14. The terminal according to claim 13, wherein the MCU is further configured to determine whether performing operation of setting Bluetooth name is required; if yes, setting a same name for the first Bluetooth module and the second Bluetooth module; if no, triggering the second Bluetooth module.

15. The terminal according to claim 14, wherein the terminal further comprises a storage module connected to the MCU, the storage module is configured to store the Bluetooth name;
the MCU specifically is configured to determine whether performing operation of setting Bluetooth name is required according to the Bluetooth name stored in the storage module; if yes, reading the MAC address of the first Bluetooth module, forming the Bluetooth name according to the MAC address of the first Bluetooth module and a SN code of the terminal, and setting name corresponding to the first Bluetooth module and the second Bluetooth module to be the Bluetooth name; if no, triggering the second Bluetooth module.

16. The terminal according to claim 13, wherein the second Bluetooth module is further configured to switch the Bluetooth broadcast from normal broadcast state to slow broadcast state when entering low power consumption state; and configured to switch the Bluetooth broadcast from slow broadcast state to normal broadcast state when being waken up.

17. The terminal according to claim 13, wherein, the second Bluetooth module is further configured to enter the low power consumption state when time for waiting the Bluetooth connecting event is out;
the MCU comprises a timer module, wherein the timer module is specifically configured to trigger the MCU to power down the first Bluetooth module when detecting that time for the second Bluetooth module waiting the Bluetooth connecting is out;
the MCU is further configured to power up the first Bluetooth module when detecting that the second Bluetooth module is waken up.

18. The terminal according to claim 13, wherein the MCU further comprises an automatic shut down module and a key module, and wherein the automatic shut down module is configured to trigger the terminal to shut down automatically when time length for pressing a key of the key module reaches time length for shutting down.

19. The terminal according to claim 13, wherein the MCU is specifically configure to power up the first Bluetooth module and the second Bluetooth module by initializing an IO connected to the first Bluetooth module and an IO connected to the second Bluetooth module.

20. The terminal according to claim 13, wherein the first Bluetooth module is further configured to pull down an IO connected to the MCU when building connection to the host.

* * * * *